United States Patent [19]

Godbersen

[11] Patent Number: 4,893,828
[45] Date of Patent: Jan. 16, 1990

[54] BOAT TRAILER ROLLER BUNK APPARATUS

[76] Inventor: Byron L. Godbersen, Lake LaJune Estates, Ida Grove, Iowa 51445

[21] Appl. No.: 292,217

[22] Filed: Dec. 29, 1988

[51] Int. Cl.$^4$ ............................................. B60P 3/10
[52] U.S. Cl. .................................. 280/414.1; 414/534; 193/35 B
[58] Field of Search .................... 280/414.1; 193/35 B

[56] References Cited

U.S. PATENT DOCUMENTS

| | | | |
|---|---|---|---|
| 3,917,087 | 11/1975 | Godberson | 280/414.1 X |
| 3,974,924 | 8/1976 | Ullman | 280/414.1 X |
| 4,592,694 | 6/1986 | Johnson | 280/414.1 X |

Primary Examiner—Charles A. Marmor
Assistant Examiner—Wook Yoon
Attorney, Agent, or Firm—Henderson & Sturm

[57] ABSTRACT

A boat trailer having a frame, a wheel and axle unit supporting the frame, a front keel and hull supporting unit mounted on the frame, and a rear cross member, a roller bunk apparatus having a pair of identical roller bunk units each mounted on a side of the longitudinal axis of the trailer; with each roller bunk unit comprising an elongated tubular member disposed parallel an adjacent frame member, and a pair of elongated tubular elements mounted on each member in longitudinal alignment, with the rear element pivotally mounted, and with a plurality of roller units mounted on each element in longitudinal spacing and alignment, and with plate units movably mounted at a rear end of each element for engagement with a trim tab portion of the boat hull.

6 Claims, 2 Drawing Sheets

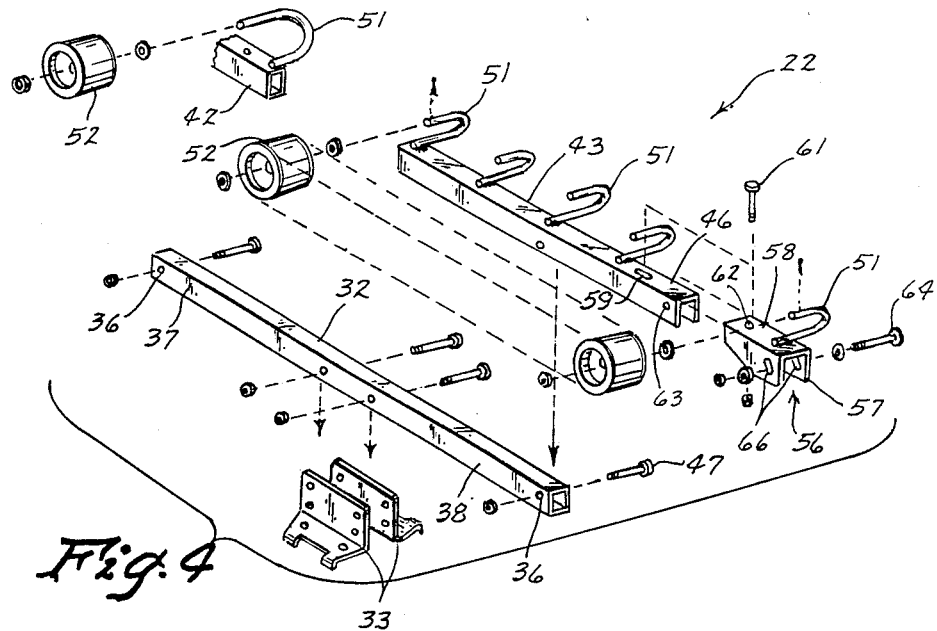
Fig. 4
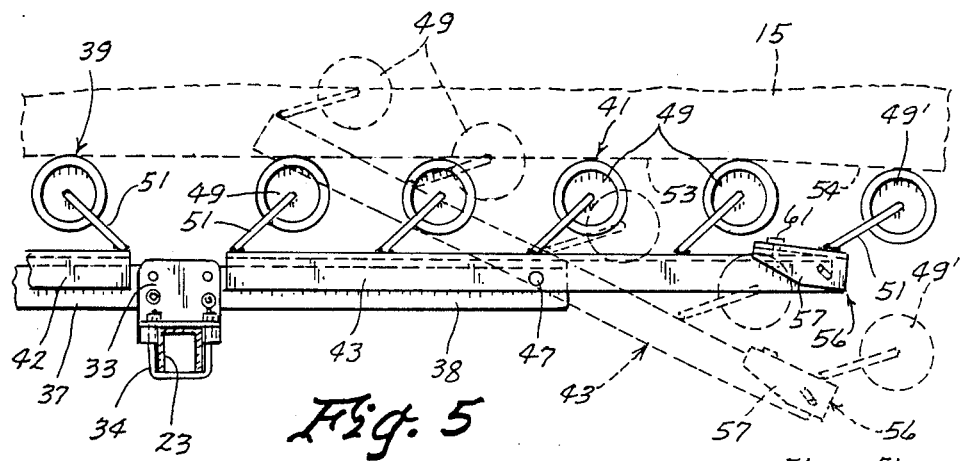
Fig. 5
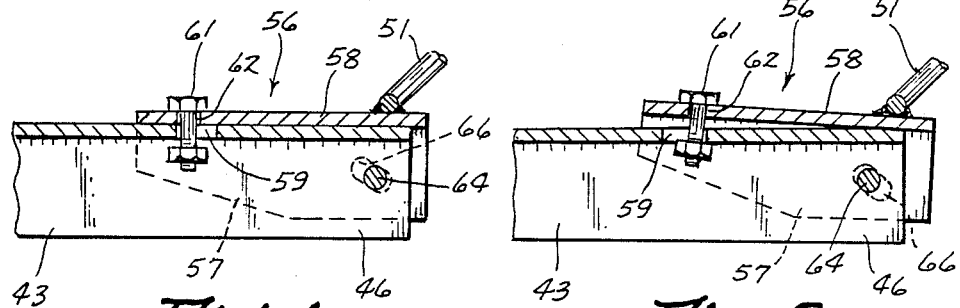
Fig. 6
Fig. 7

BOAT TRAILER ROLLER BUNK APPARATUS

TECHNICAL FIELD

The present invention relates generally to boat carrying trailers, and more particularly to those of the type in which a longitudinal frame having a tongue and hitch for attachment to a prime mover is equipped with support units engaging the keel and the bottom of the boat hull adjacent the bow and stern, respectively, the frame having a pair of ground wheels adjacent the rear of the frame. To load and unload the boat to and from the trailer, the trailer is moved into the water a sufficient distance to enable the boat to float on and off the trailer, as controlled by a winch assembly adjacent the hitch.

BACKGROUND ART

With an ever increasing number of different sized and shaped boats, the contemporary trailers have tended to develop an ever increasing arrangement of bow, keel and stern supports for accommodating the great variety of trailers. Proper distribution of the weight of the trailer on the frame such that pressure on the tongue will accommodate a balanced connection to the prime mover has been attempted by having one or more stationary hull and keel support units mounted forwardly on the frame, and either bunks or gangs of horizontally and vertically adjustable rollers mounted rearwardly on the frame. Examples of various such arrangements are shown in U.S. Pat. Nos. 2,816,672; 2,948,423; 3,774,790 and 3,917,087.

Nevertheless, the trailer industry has not only not solved the constant problem of ease of adjustment for proper tongue weight distribution, but has exacerbated the problem by proliferation of the types and arrangement of gangs of rollers such that the problem has actually worsened. Further, there have been no improvements of consequence to the structures for supporting the boat hull and keel, other than that mentioned immediately hereinafter.

In my pending application, Ser. No. 07/112,476 filed Oct. 26, 1987, I revealed an improved boat hull and keel supporting assembly for use with a boat trailer. Although a decided improvement over the prior art, one disadvantage has been found that there is a tendency to cause some scouring and/or scratching of the keel by the keel supporting portion of that assembly due to the presence of sand, gravel and the like on the keel of the boat as the boat is being moved to relative to the trailer and during transportation thereon.

It is to the elimination of the problem of the proper support of the hull of the boat being carried by the trailer that this invention is directed.

Further problems of weight distribution of the boat on the trailer relate to the placement of the rare hull support arrangement of bunks or gangs of rollers, in that certain bridging or bowing of the boat trailer frame occurs due to an improper stacking of the boat load too far away from the wheel and axle assembly. This invention is further directed to the elimination of that problem.

Still another problem exists in the potential for the dragging of the rear ends of the rear bunks or roller assemblies in certain conditions of loading and/or unloading of the boat relative to the trailer. This invention is further directed to the avoidance of this problem.

Still another problem in contemporary boat trailers relates to an unequal support of the boat hull by particularly the rear gangs of rollers or bunks. The present invention provides an even fit and support equalizing the weight distribution of the boat on the trailer where the hull is the strongest.

DISCLOSURE OF THE INVENTION

In a trailer for transporting a boat or the like, the trailer having a longitudinal frame of wishbone shape, the forward tongue end having a hitch for connection to a prime mover, having a stand-mounted winch assembly for cable control of the boat, a wheel and axle unit mounted rearwardly of the frame, a hull and keel supporting assembly secured to the frame forwardly of the wheel and axle unit, and a cross member unit mounted laterally across the rear frame members of the trailer; the invention comprises a roller bunk assembly having roller bunk units disposed on either side of the longitudinal axis of the frame, a mounting bracket for each of the roller bunk units for securement thereof to the cross member unit, each roller bunk unit including an elongated tubular member mounted intermediate its ends to the cross member unit, a pair of elongated tubular elements, each element mounted in aligned relation on said member, with one element mounted at the front end thereof and a second element mounted at the rear of the member, with the rear element pivotally secured to the member, and a plurality of roller units engageable with the boat hull mounted in longitudinally spaced, aligned relation on each of the elements.

The invention comprises further a plate unit movably mounted on the rear end of the rear, pivotally mounted element for adjustable engagement with the trim tab portion of the hull thereabove, when a boat is fully loaded onto the trailer. The plate unit is movable not only vertically relative to the rear element, but longitudinally thereof.

It is an object of this invention to provide a new and novel trailer of the type described herein.

It is another object of this invention to provide a pair of roller bunk units, each unit disposed on either side of the longitudinal axis of the frame, and with each bunk unit supporting a plurality of roller units mounted in longitudinally spaced, aligned relation.

It is yet another object of this invention to provide an improved boat trailer as described hereinbefore, and further wherein a plurality of roller units are mounted on an elongated, tubular element pivotally connected to the rear end of each bunk unit.

Still another object of this invention is to provide a boat trailer of the type described hereinbefore, and wherein a plate unit is movably mounted at the rear of each of said pivotally mounted, roller carrying units for both vertically and horizontally adjustable movement relative to the pivotal element for continuous engagement with the trim tab portion of the hull of the boat carried on the trailer.

BRIEF DESCRIPTION OF THE DRAWINGS

These and other attributes of the invention will become more clear upon a thorough study of the following description of the best mode for carrying out the invention, particularly when reviewed in conjunction with the accompanying drawings, wherein:

FIG. 4 is a perspective, exploded view of the roller bunk assembly of this invention;

FIG. 5 is an enlarged side elevational, fragmentary view of the roller bunk assembly;

FIG. 6 is an enlarged sectional view of the rear end of a roller carrying unit of FIG. 5, and showing a plate unit for adjustable engagement with the trim tab portion of a boat hull; and FIG. 7 is a view similar to FIG. 6, showing vertical and horizontal movement of the plate unit.

BEST MODE FOR CARRYING OUT THE INVENTION

Figure 1:
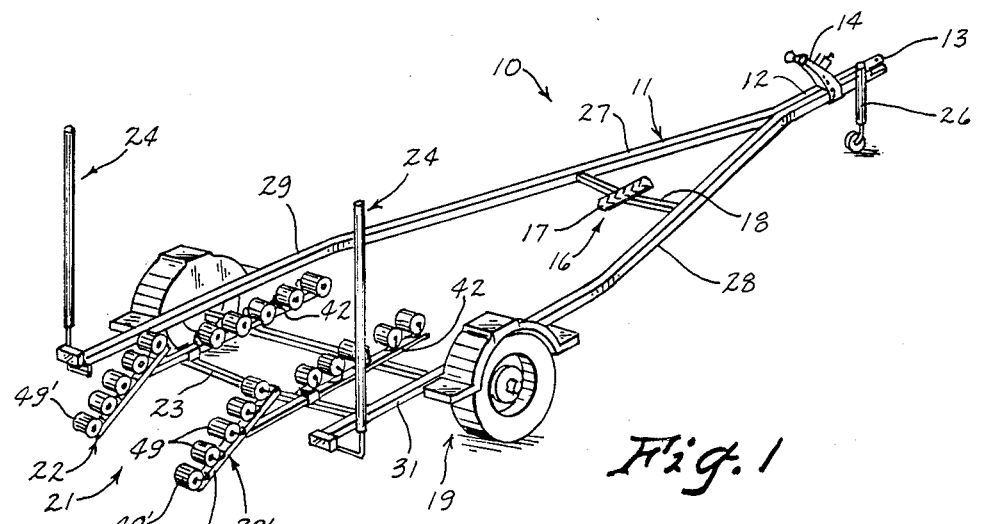
FIG. 1 is a perspective view of the boat trailer of the present invention.
Figure 2:
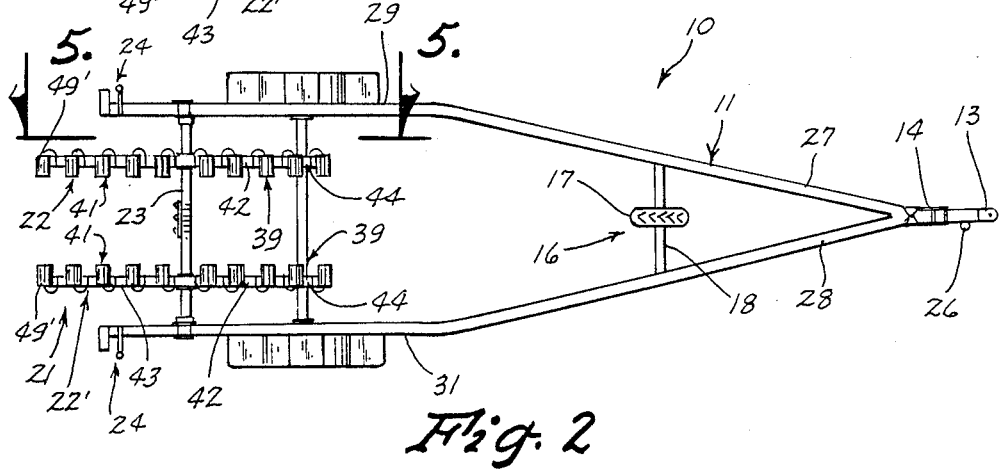
FIG. 2 is a top plan view thereof.
Figure 3:
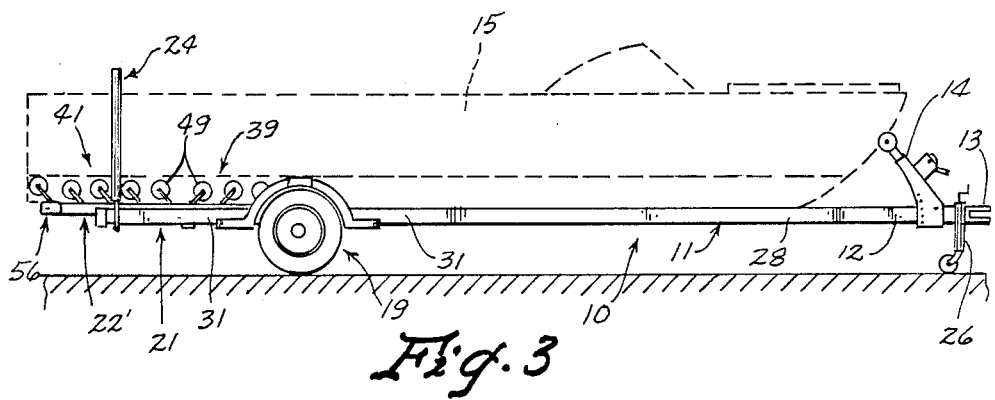
FIG. 3 is a side elevational view thereof, a boat being carried by the trailer being shown by dotted lines.

Referring now to the drawings, the boat trailer of this invention is illustrated generally at (10) in FIGS. 1–3 and comprises a frame assembly (11) including a tongue (12) and hitch (13) for conventional attachment to a prime mover (not shown); a winch and stand assembly (14) mounted on the tongue (12) for mounting and demounting connection to the boat (15) (FIG. 3) to be transported thereby; a hull and keel supporting assembly (16) which includes a pivotal keel supporting unit (17) and a front hull supporting unit (18); a wheel and axle unit (19) for rollably supporting the rear of the frame assembly (11); a rear hull supporting unit (21) including a pair of in-line roller units (22) and (22') mounted on a cross member (23); and a post load guide unit (24). A conventional jack unit (26) is provided the front of the tongue (12) for supporting the trailer (10) in a horizontal position while not connected to a prime mover.

The frame assembly (11) includes a pair of diverging side members (27, 28) with integral, parallel rear members (29, 31), the latter mounted on the wheel and axle unit (19). The diverging side members (27, 28) are interconnected by the front hull supporting unit (18) of the hull and keel supporting assembly (16).

More particularly, the roller bunk units (22), (22') of this invention each comprise an elongated tubular member (32) (FIG. 4) mounted by brackets (33) and fasteners (34) intermediate its ends to the cross member (23). Openings (36) are provided in transversely aligned relation across both the front end (37) and the rear (38) of the tubular member (32).

A pair of substantially identical roller units (39) and (41) (FIGS. 1 and 5) are provided, each including an elongated tubular elements (42) and (43) (FIG. 5) of a size and shape to nest on top of and embrace the upper and side surfaces of each respective end portion (37) and (38) of the tubular member (32). It will be noted that the length of the elements (42), (43) is more than the length of the end portions (37), (38) of the tubular member (32) such that front and rear ends respectively of the elements (42), (43) extend forwardly and rearwardly, respectively of the front and rear ends (37), (38) of the tubular member (32). Please note in FIG. 5 the rear end (46) of the tubular element (43) extending beyond the rear end (38) of the tubular member (32).

Although both elements (42), (43) can be pivotally mounted on their respective ends (37), (38) of the tubular member (32), in the present instance, the forward element (42) is secured in its nested condition with the front end (37); whereas, by means of a pivot fastener (47), the rearward element (43) is pivotally connected to the rear end (38) of the member (32), and thus is pivotally movable within a vertical plane into and out of the nested condition thereof with the member (32); however, it will be noted that the element (43) remains nested with the member (32) about the pivot (47).

A plurality of roller units (49) (FIGS. 4 and 5) for self seeking engagement with the hull of the boat (15) being transported by the trailer (10) are provided, each unit (49) including a U-shape, flexible arm (51) secured as by welding to a respective element (42) or (43) in longitudinally spaced, aligned relation thereon; and rollers (52) are fastened to each of the arms (51) to complete the roller units (49).

As seen in FIG. 5, the rear end of the hull (53) of the boat (15) is provided with a trim tab (54) for the purpose of aiding the boat (15), such as a power boat, to quickly attain a plane position of movement for speed purposes. To accommodate this variation in the surface of the hull (53), a plate unit (56) (Figs. 5–7) is provided, each unit (56) being movably mounted on the rear end (46) of each element (43) from adjustable movement not only in a vertical plane but also in a horizontal plane, or longitudinally of the element (43) for continuous engagement with the hull trim tab (54).

Each plate unit (56) comprises a U-shaped bracket (57) which embraces the rear end (46) of the element (43), with the bracket (57) including an upper plate (58) adapted to rest flat on top of the element (43) and with a roller unit (49') mounted thereon (FIG. 6). An elongated slot (59) is formed in the rear end (46) for receiving a pivot bolt (61) which passes through an opening (62) formed in the plate, and which secures the bracket (57) to the rear end (46) in a manner such that, by virtue of the elongated slot (59), the bracket (57) is movable longitudinally of the element rear end (46).

Aligned holes (63) are formed in the element rear end (46) for receiving a pin (64) (FIG. 7), and which pin fastener (64) also passes through transversely aligned slots (66) formed in the sides of the bracket (57) (FIG. 4). By this arrangement, as is best shown in FIGS. 6 and 7, the plate units (56) are pivotally mounted on the element rear ends (46) for simultaneous movement longitudinally of each element (43), and also vertically thereof, again for maintaining continuous engagement with the hull trim tab (54).

Accordingly, it can be seen that the illustrated embodiment of the present invention accomplishes all of the objectives referred to hereinbefore. Obviously, many modifications and variations of the present invention are possible in light of the above teachings. It is therefore to be understood that, within the scope of the appended claims, the invention may be practiced otherwise than as specifically described.

I claim:

1. In a trailer for hauling a boat having a hull with a trim tab at its rear, the trailer having a wheel and axle supported frame including a pair of frame members extended rearwardly from a tongue connection in a diverging then parallel and laterally spaced manner, a cross member assembly extended between the frame members adjacent the axle, a roller bunk apparatus comprising:

roller bunk means disposed on either side of the longitudinal axis of the frame;

means mounting each said roller bunk means to the cross member assembly;

each said roller bunk means including elongated tubular means disposed longitudinally of the frame and parallel a frame member, said tubular means having front and rear portions;

roller carrying means mounted on each of said front and rear end portions for engaging the hull of the boat being carried by the trailer, one of said roller carrying means pivotally movable on said tubular means;

and further wherein said one roller carrying means is pivotally mounted on said rear end portion;

and further wherein each roller carrying means includes an elongated element connected to each said front and rear end portions;

and further wherein each element embraces a said end portion in a nested manner, said one roller carrying means retaining said nested condition while being pivotally movable.

2. A roller bunk assembly as described in claim 1, and a plurality of roller units secured to and extended normally above each of said elements in longitudinally spaced, aligned relation.

3. A roller bunk assembly as described in claim 1, and further wherein said elongated element connected to said rear end portion includes further means pivotally mounted on said element and having a plate movable from a first position contiguous with said element to a second position raised above said element, and a roller unit mounted on said pivotally mounted means for adjustable engagement with the hull of the boat being carried by the trailer.

4. In a trailer for hauling a boat having a hull with a trim tab at its rear, the trailer having a wheel and axle supported frame including a pair of frame members extended rearwardly from a tongue connection in a diverging then parallel and laterally spaced manner, a cross member assembly extended between the frame members adjacent the axle, the improvement comprising:

a pair of roller bunk units each mounted on the cross member assembly in laterally spaced relation and extended parallel each other and a frame member, each bunk unit comprising:

an elongated tubular member mounted intermediate its ends to the cross member assembly;

a pair of elongated tubular elements, each element shorter than said tubular member, mounted in aligned relation on said member, one element mounted at a front end of said member and a second element mounted at a rear end of said member, at least one of said elements pivotally mounted on said member; and a plurality of roller units engageable with the boat hull mounted in longitudinally spaced, aligned relation on each of said elements.

5. The boat trailer of claim 4 and further wherein plate means are movably mounted on a rear end of said pivotally mounted element for adjustable movement in a vertical plane for variable engagement with the hull trim tab.

6. The boat trailer of claim 5, and further wherein said plate means is pivotally mounted on said element rear end for simultaneous movement longitudinally of said element and vertically thereof.

* * * * *